May 20, 1941. H. C. SWIFT 2,242,685
BRAKE
Filed May 18, 1939
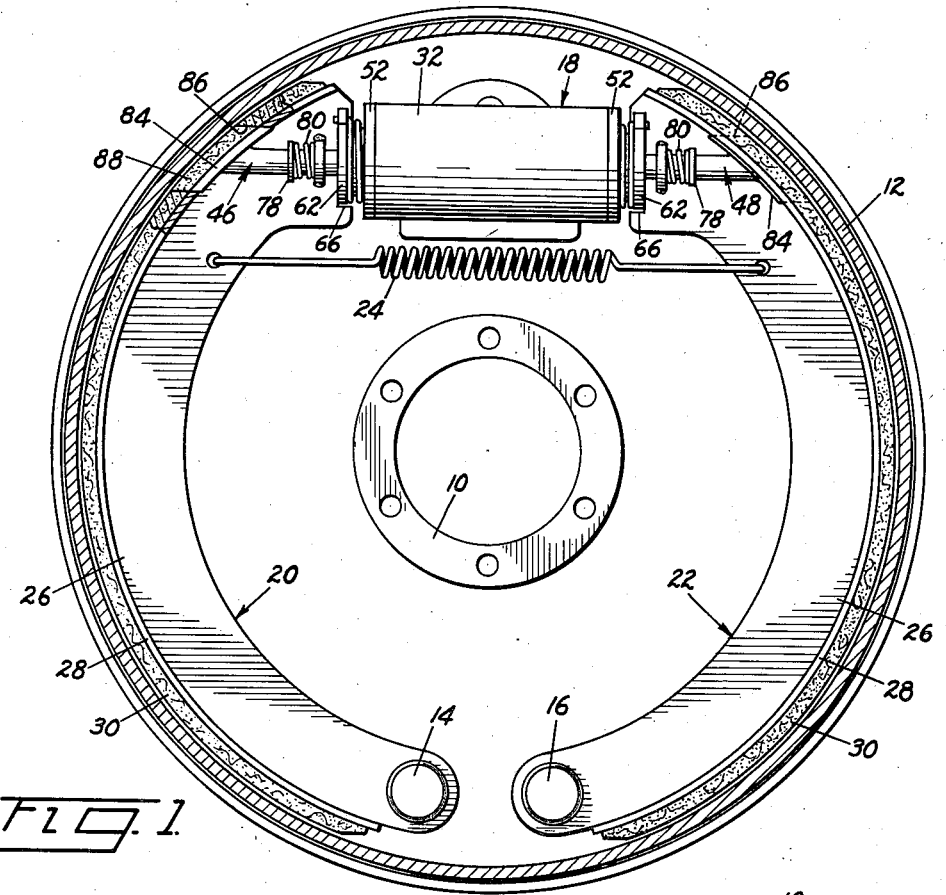
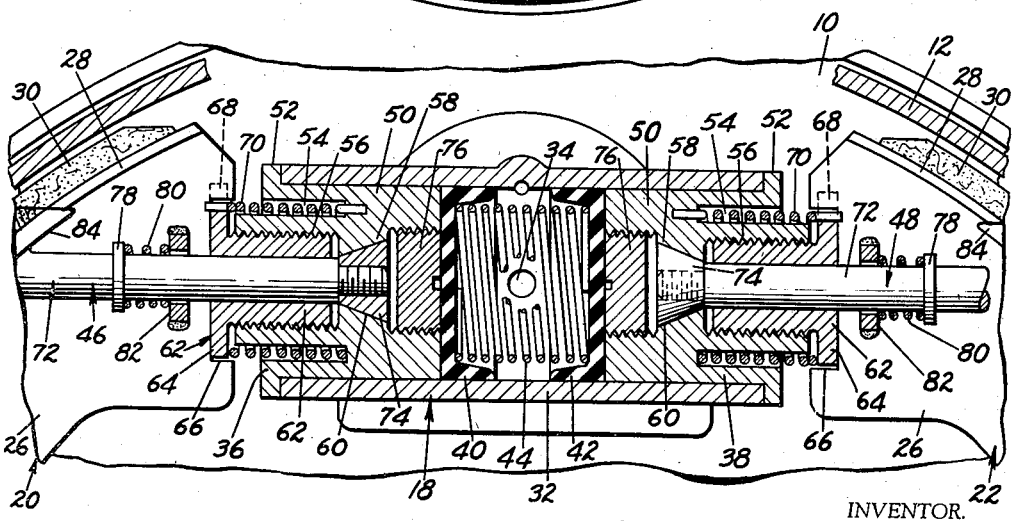
INVENTOR.
HARVEY C. SWIFT
BY
ATTORNEY.

Patented May 20, 1941

2,242,685

UNITED STATES PATENT OFFICE 2,242,685

BRAKE

Harvey C. Swift, Detroit, Mich., assignor to Hydraulic Brake Company, Detroit, Mich., a corporation of California Application May 18, 1939, Serial No. 274,463

6 Claims. (Cl. 188—79.5)

This invention relates to brakes, and more particularly to means for adjusting the friction elements of brakes.

An object of the invention is to provide means for automatically adjusting the friction elements of a brake.

Another object of the invention is to provide an automatic adjuster for the friction element of a brake controlled by wear on the lining of the friction element.

Another object of the invention is to provide an automatic adjuster for a brake operative to adjust the friction element of the brake proportionately to wear on the lining of the friction element so that the friction element may be supported in proper spaced relation to the drum when in retracted position.

Other objects of the invention will appear from the following description taken in connection with the drawing forming a part of this specification, and in which;

Fig. 1 is a vertical sectional view of a brake embodying the invention; and

Fig. 2 is an enlarged longitudinal sectional view.

Referring to the drawing for more specific details of the invention, 10 represents a fixed support or backing plate adapted to be secured to an axle or to an axle housing, and associated with the backing plate is a rotatable drum 12 adapted to be secured to a wheel.

The backing plate has arranged thereon spaced anchors 14 and 16, and a fluid pressure actuated motor indicated generally at 18. A pair of corresponding interchangeable friction elements or shoes 20 and 22 suitable for cooperation with the drum have their articulate ends pivoted on the anchors. The force applying ends of the shoes are connected to the motor 18, and a retractile spring 24 connects the shoes adjacent their force applying ends. The shoes may be of any desirable type. Preferably each of the shoes includes a web 26 supporting a rim 28 having secured thereto a friction lining 30 suitable for cooperation with the drum 12.

The motor 18 includes a cylinder 32 open at both of its ends and provided substantially centrally of its length with a port 34 adapted to be connected to a suitable source of fluid pressure. The cylinder has therein opposed reciprocable pistons 36 and 38 having on their heads sealing cups 40 and 42 held against displacement by a spring 44 interposed between the cups.

Adjusters 46 and 48 associated with the pistons 36 and 38 are operative to automatically adjust the friction elements 20 and 22 with relation to the drum 12. As shown, each of the pistons includes a body portion 50 having a flange 52 adapted to abut the adjacent end of the cylinder when the piston is in retracted position. The piston has a concentric groove or channel 54, the purpose of which will hereinafter appear, and an axial bore 56 having therein a partition 58 provided with a frustro-conical opening 60.

A sleeve 62 threaded in the outer end of the bore 56 has a circumferential flange 64 received by a slot 66 in the web of the adjacent shoe, and the sleeve is secured against rotation by a slot 68 in the flange cooperating with the web. A torsion spring 70 slipped in the concentric channel 54 in the piston has one of its ends connected to the flange 64 and its other end secured to the piston in the bottom of the channel. This spring normally tends to rotate the piston within the cylinder.

A rod 72 reciprocable in the sleeve 62 has on one end a conical head 74 adapted to seat in the conical opening 60 in the partition 58, and a plug 76 secured in the inner end of the axial bore 56 closes the inner end of the bore so as to complete the face of the piston to provide an unbroken surface or seat for the associated sealing cup. The rod has thereon a collar 78 and a spring 80 interposed between the collar and a ring 82 fixedly secured to the web of the shoe and encompassing the rod. The spring 80 urges the rod outwardly so as to seat the head 74 in the opening 60 wherein the head 74 frictionally holds the piston against rotation.

The outer end of the rod has thereon a head 84 slidable in an opening 86 through the rim 28 and lining 30 of the shoe, and suitably secured to the head 84 is a lining 88 having a coefficient of friction lower than that of the lining on the shoe.

In a normal operation, upon energization of the fluid pressure actuated motor 18, the friction elements or shoes 20 and 22 are moved into engagement with the drum 12 against the resistance of the retractile spring 24 to retard rotation of the drum. In effecting this operation, the pistons 36 and 38 of the motor 18 are moved in opposite directions, and force is transmitted from the pistons through the sleeves 62 threaded in the outer ends of the pistons to the force-applying ends of the shoes 20 and 22 to engage the friction linings 30 on the shoes with the drum.

During this operation, the adjusters 46 and 48 carried by and movable with the pistons are moved to engage the linings 88 thereon with the drum. The linings 30 on the friction elements are subject to the usual wear incidental to a braking operation, and the wear on the linings 88 of the adjusters, because of their low coefficient of friction, is negligible. Accordingly, this differential of wear results in relative movement between the friction element or shoe and the adjuster, and during this movement the rod 72 is moved against the resistance of the spring 80. This results in moving the head 74 on the inner end of the rod from its seat in the conical opening 60, whereupon the torsion spring 70 becomes effective to rotate the piston. As the piston rotates, it travels on the threaded sleeve 62, so as to take up clearance and again seat the head 74 in the opening 60 where it is held by the spring 80 and frictionally holds the piston against rotation.

The operation just described results in extending the overall length of the piston and moving the head 84 on the adjuster in the opening 86 through the rim 28 and lining 30 of the shoe so that the lining 88 on the head 84 of the adjuster is contiguous with the lining on the shoe, hence, upon conclusion of a braking operation and return of the friction elements or shoes to retracted position under the influence of the retractile spring 24, the shoes are supported by the sleeves 62 threaded in the outer ends of the pistons in proper spaced relation to the drum.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a fixed support, a rotatable drum associated therewith, a pair of friction elements on the support having linings for cooperation with the drum, means for actuating the friction elements including a cylinder, opposed extensible pistons reciprocable in the cylinder, means for extending the pistons proportionately to wear on the linings and means cooperating with the drum for control of the means for extending the pistons.

2. A brake comprising a rotatable member, a friction element for cooperation with the rotatable member, an actuator for the friction element including an extensible piston, means for extending the piston, means for control of the means for extending the piston, and means cooperating with the rotatable member to release the control means.

3. A brake comprising a rotatable member, a friction element for cooperation with the rotatable member, an actuator for the friction element including a cylinder, an extensible piston reciprocable therein, means tending to extend the piston, means for control of the means tending to extend the piston and means cooperating with the rotatable member for governing the control means.

4. A brake comprising a rotatable drum, a friction element for cooperation with the drum, an actuator for the friction element including a cylinder, an extensible piston reciprocable in the cylinder, a torsion spring tending to extend the piston, a friction holding means for control of the spring, and means cooperating with the drum for controlling the holding means.

5. A brake comprising a fixed support, a rotatable drum associated therewith, a pair of friction elements on the support for cooperation with the drum, an actuator for the friction elements including a cylinder, opposed extensible pistons reciprocable in the cylinder, torsion springs tending to extend the pistons, friction holding means controlling the springs, means cooperating with the drum for releasing the holding means, and means tending to engage the holding means.

6. A brake comprising a fixed support, a rotatable drum asociated therewith, a pair of friction elements on the support for cooperation with the drum, an actuator for the friction elements including a cylinder, opposed pistons reciprocable in the cylinder having relatively movable parts, stops determining the retracted positions of the pistons, torsion springs tending to extend the pistons, friction holding means for control of the springs, means cooperating with the drum for releasing the holding means, and means tending to engage the holding means.

HARVEY C. SWIFT.